(12) United States Patent
Shibayama et al.

(10) Patent No.: US 8,045,157 B2
(45) Date of Patent: *Oct. 25, 2011

(54) SPECTROSCOPIC MODULE

(75) Inventors: Katsumi Shibayama, Hamamatsu (JP);
Helmut Teichmann, Zurich (CH);
Takafumi Yokino, Hamamatsu (JP);
Tomofumi Suzuki, Hamamatsu (JP);
Dietmar Hiller, Zurich (CH); Ulrich Starker, Zurich (CH)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 24 days.

This patent is subject to a terminal disclaimer.

(21) Appl. No.: 12/377,336

(22) PCT Filed: Jun. 5, 2008

(86) PCT No.: PCT/JP2008/060389
§ 371 (c)(1),
(2), (4) Date: Feb. 12, 2009

(87) PCT Pub. No.: WO2008/149948
PCT Pub. Date: Dec. 11, 2008

(65) Prior Publication Data
US 2010/0103412 A1 Apr. 29, 2010

(30) Foreign Application Priority Data
Jun. 8, 2007 (JP) .................. 2007-152966

(51) Int. Cl.
*G01J 3/28* (2006.01)
(52) U.S. Cl. ...................................... 356/328
(58) Field of Classification Search ............ 356/328
See application file for complete search history.

(56) References Cited

U.S. PATENT DOCUMENTS

| | | | |
|---|---|---|---|
| 4,784,935 A * | 11/1988 | Ehrfeld et al. | 356/328 |
| 5,026,160 A | 6/1991 | Dorain et al. | |
| 6,081,331 A | 6/2000 | Teichmann | |
| 6,181,418 B1 | 1/2001 | Palumbo et al. | |
| 6,303,934 B1 | 10/2001 | Daly et al. | |
| 6,657,723 B2 | 12/2003 | Cohen et al. | |

(Continued)

FOREIGN PATENT DOCUMENTS

CN 1800941 7/2006

(Continued)

OTHER PUBLICATIONS

F. Reininger, et al., "VIRTIS: Visible Infrared Thermal Imaging Spectrometer for the Rosetta Mission," Proceedings. SPIE, vol. 2819 [Imaging Spectrometry II], Aug. 1996, pp. 66-77.

(Continued)

*Primary Examiner* — Kara E Geisel
(74) *Attorney, Agent, or Firm* — Drinker Biddle & Reath LLP

(57) ABSTRACT

Since a spectroscopic module (1) has a plate-shaped body section (2), the spectroscopic module can be reduced in size by reducing the thickness of the body section (2). Moreover, since the body section (2) is plate-shaped, the spectroscopic module (1) can be manufactured, for example, by using a wafer process. More specifically, by providing lens sections (3), diffraction layers (4), reflection layers (6) and light detecting elements (7) in a matrix form on a glass wafer which becomes many body sections (2) and dicing the glass wafer, many spectroscopic modules (1) can be manufactured. This enables easy mass production of spectroscopic modules (1).

19 Claims, 15 Drawing Sheets

U.S. PATENT DOCUMENTS

| | | |
|---|---|---|
| 6,862,092 B1 | 3/2005 | Ibsen et al. |
| 7,092,090 B2 | 8/2006 | Shimizu et al. |
| 7,369,228 B2 | 5/2008 | Kerstan et al. |
| 7,605,917 B2 | 10/2009 | Teichmann et al. |
| 7,697,137 B2 | 4/2010 | Comstock, II |
| 2003/0197862 A1* | 10/2003 | Cohen et al. ............... 356/328 |
| 2004/0196458 A1* | 10/2004 | Shimizu et al. ............ 356/328 |
| 2004/0239931 A1 | 12/2004 | Teichmann et al. |
| 2007/0252989 A1* | 11/2007 | Comstock ................... 356/328 |
| 2010/0201980 A1* | 8/2010 | Shibayama et al. ........ 356/326 |
| 2010/0208257 A1 | 8/2010 | Shibayama et al. |
| 2010/0208258 A1 | 8/2010 | Shibayama et al. |
| 2010/0208259 A1 | 8/2010 | Suzuki et al. |
| 2010/0214563 A1 | 8/2010 | Suzuki et al. |
| 2010/0238439 A1 | 9/2010 | Suzuki et al. |

FOREIGN PATENT DOCUMENTS

| | | |
|---|---|---|
| DE | 197 17 015 | 10/1998 |
| JP | 54-143685 | 11/1979 |
| JP | 62-006126 | 1/1987 |
| JP | 63-229765 | 9/1988 |
| JP | 4-294223 | 10/1992 |
| JP | 5-322653 | 12/1993 |
| JP | 6-129908 | 5/1994 |
| JP | 6-229829 | 8/1994 |
| JP | 8-145794 | 6/1996 |
| JP | 2000-298066 | 10/2000 |
| JP | 3119917 | 10/2000 |
| JP | 2003-139611 | 5/2003 |
| JP | 2003-202463 | 7/2003 |
| JP | 2003-243444 | 8/2003 |
| JP | 2003-318478 | 11/2003 |
| JP | 2003-337206 | 11/2003 |
| JP | 2004-191246 | 7/2004 |
| JP | 2004-354176 | 12/2004 |
| JP | 2004-537750 | 12/2004 |
| JP | 2005-308495 | 11/2005 |
| JP | 2006-030031 | 2/2006 |
| WO | WO 99/53350 | 10/1999 |

OTHER PUBLICATIONS

U.S. Office Action dated May 19, 2011 that issued in U.S. Appl. No. 12/377,325 including a Double Patenting Rejection on pp. 3-4.

* cited by examiner

Fig.3
(a)
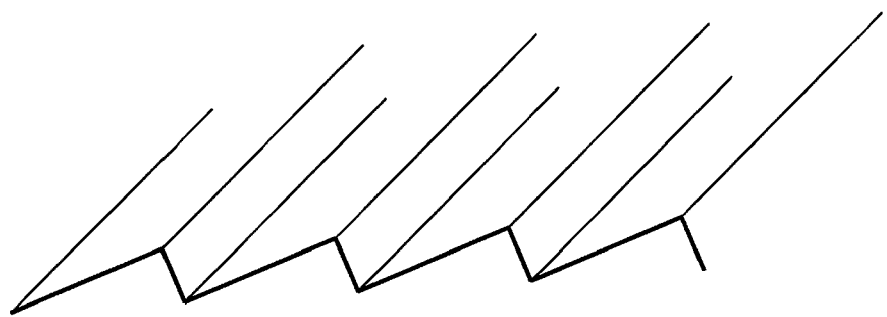
(b)
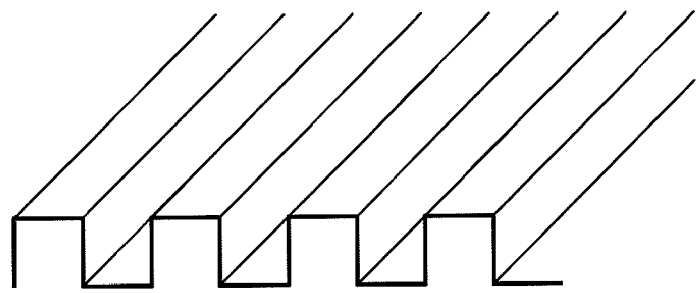
(c)
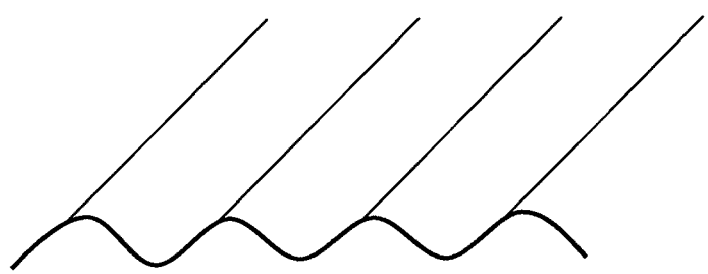

Fig.4
(a)
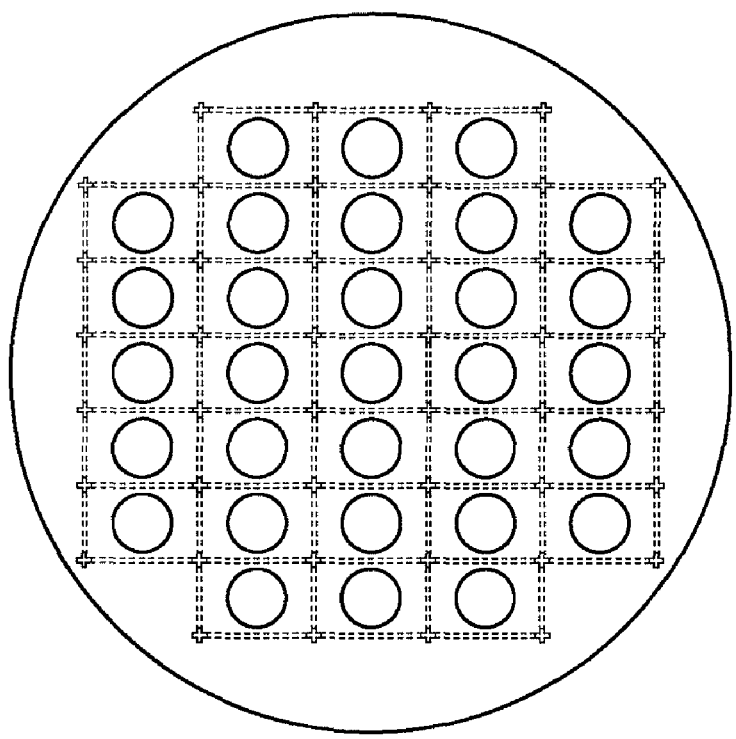
(b)

Fig.6
(a)
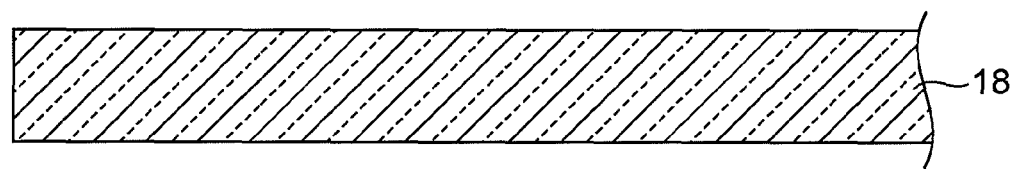
(b)
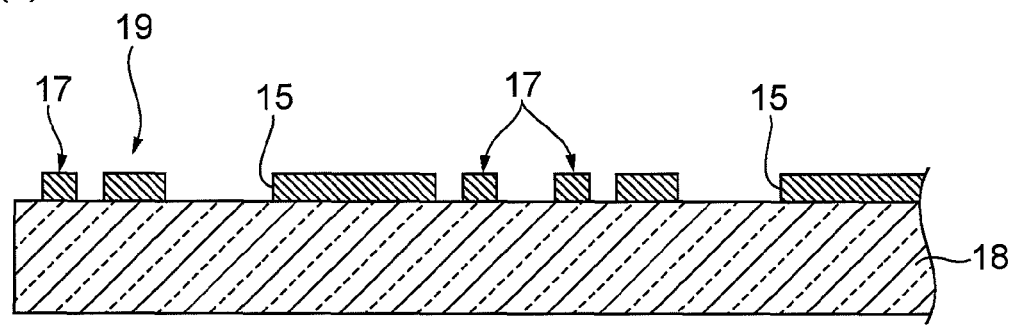
(c)
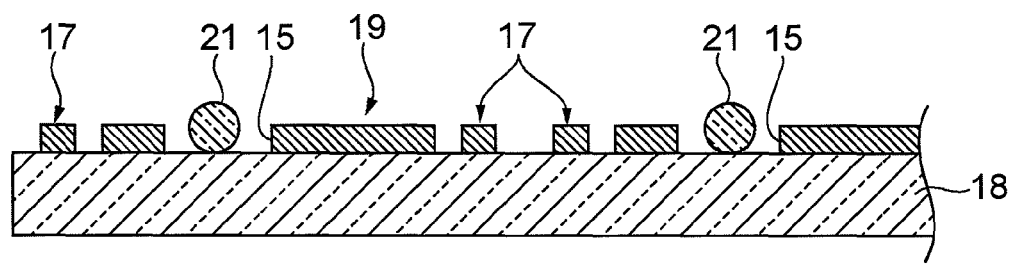

Fig.7
(a)
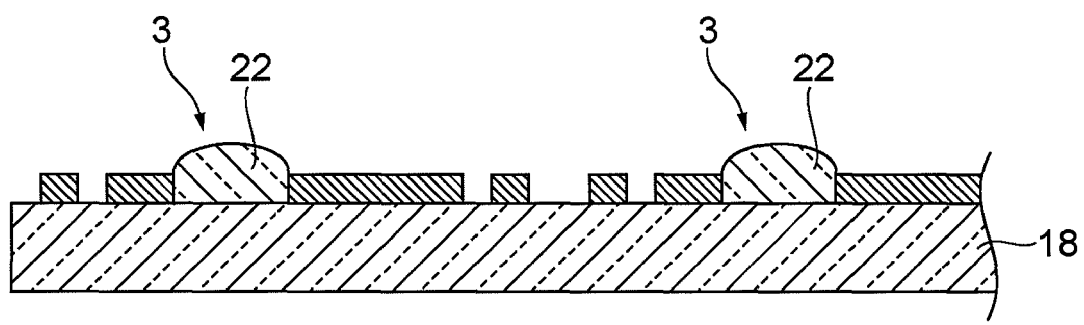
(b)
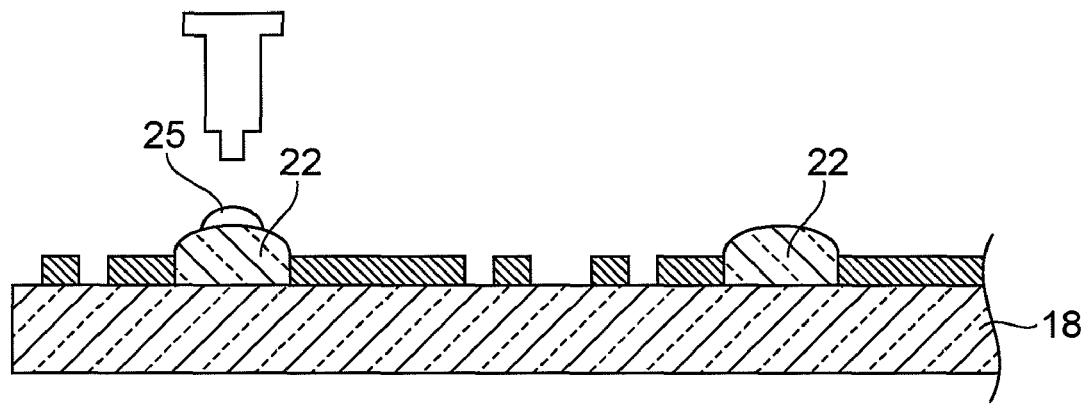

Fig.8
(a)
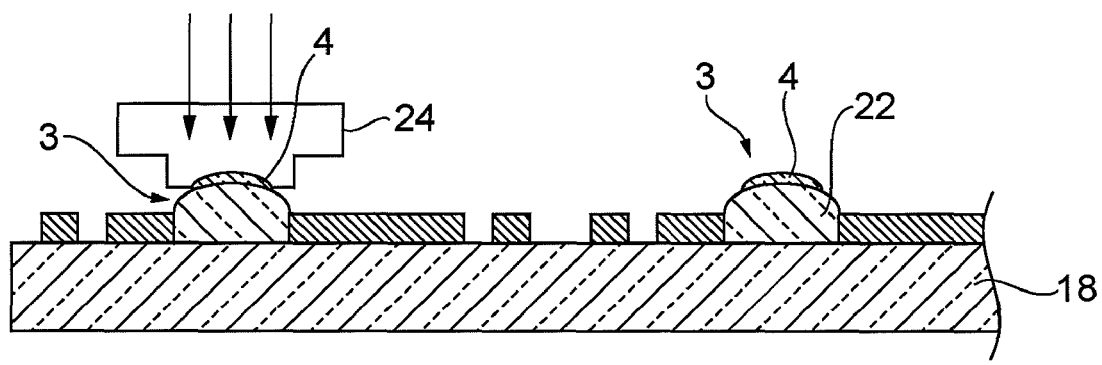
(b)
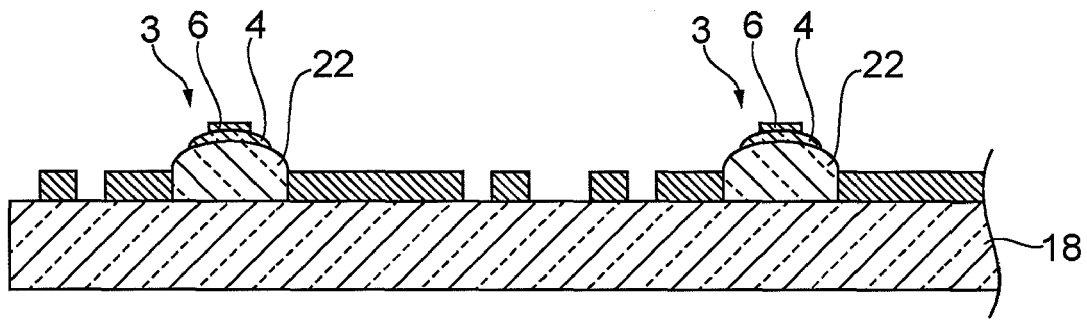

Fig.11
(a)
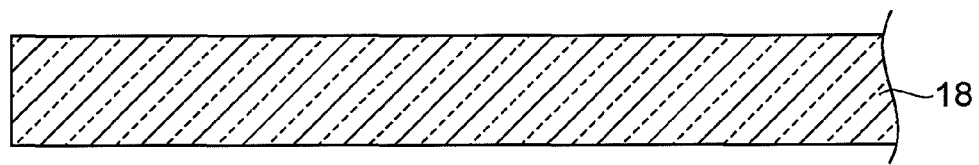
(b)
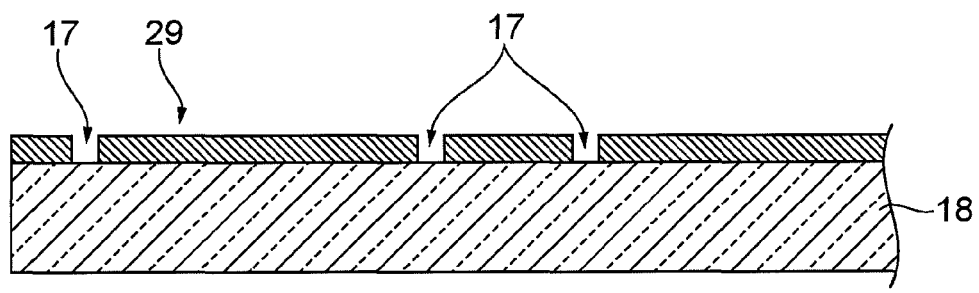
(c)
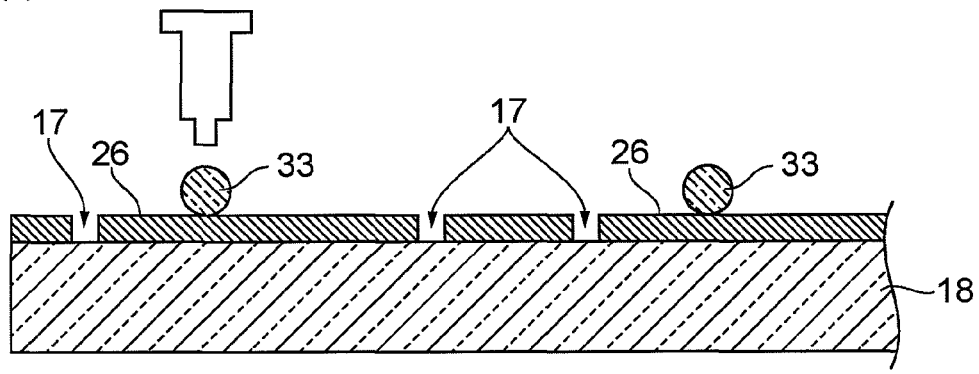

Fig.12
(a)
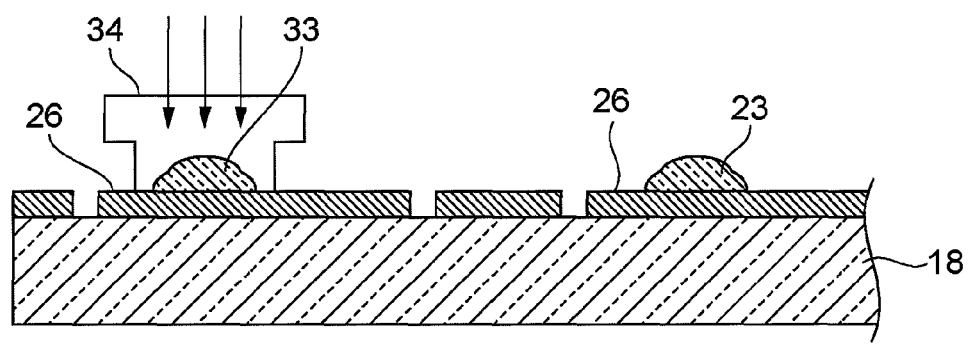
(b)
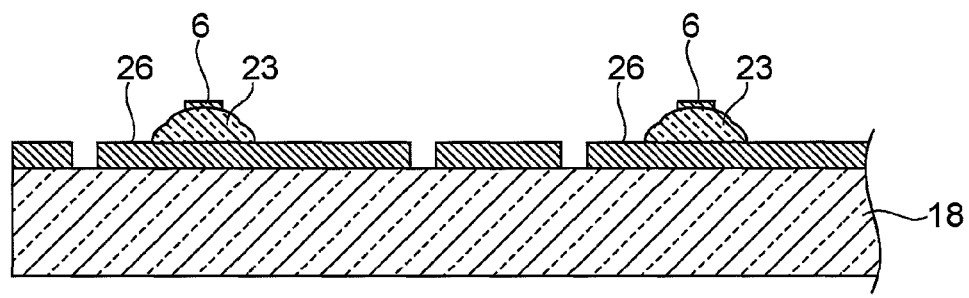

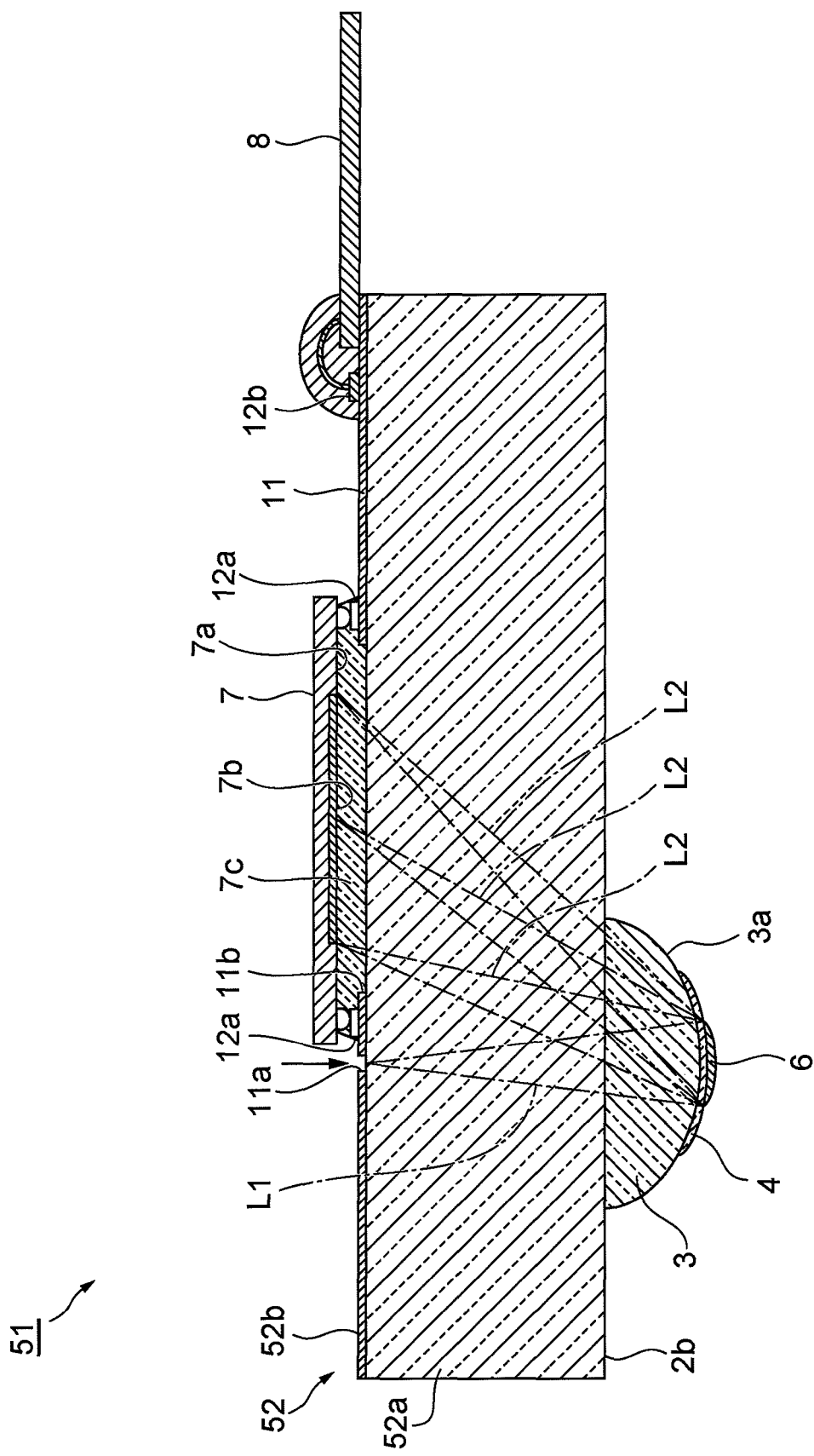

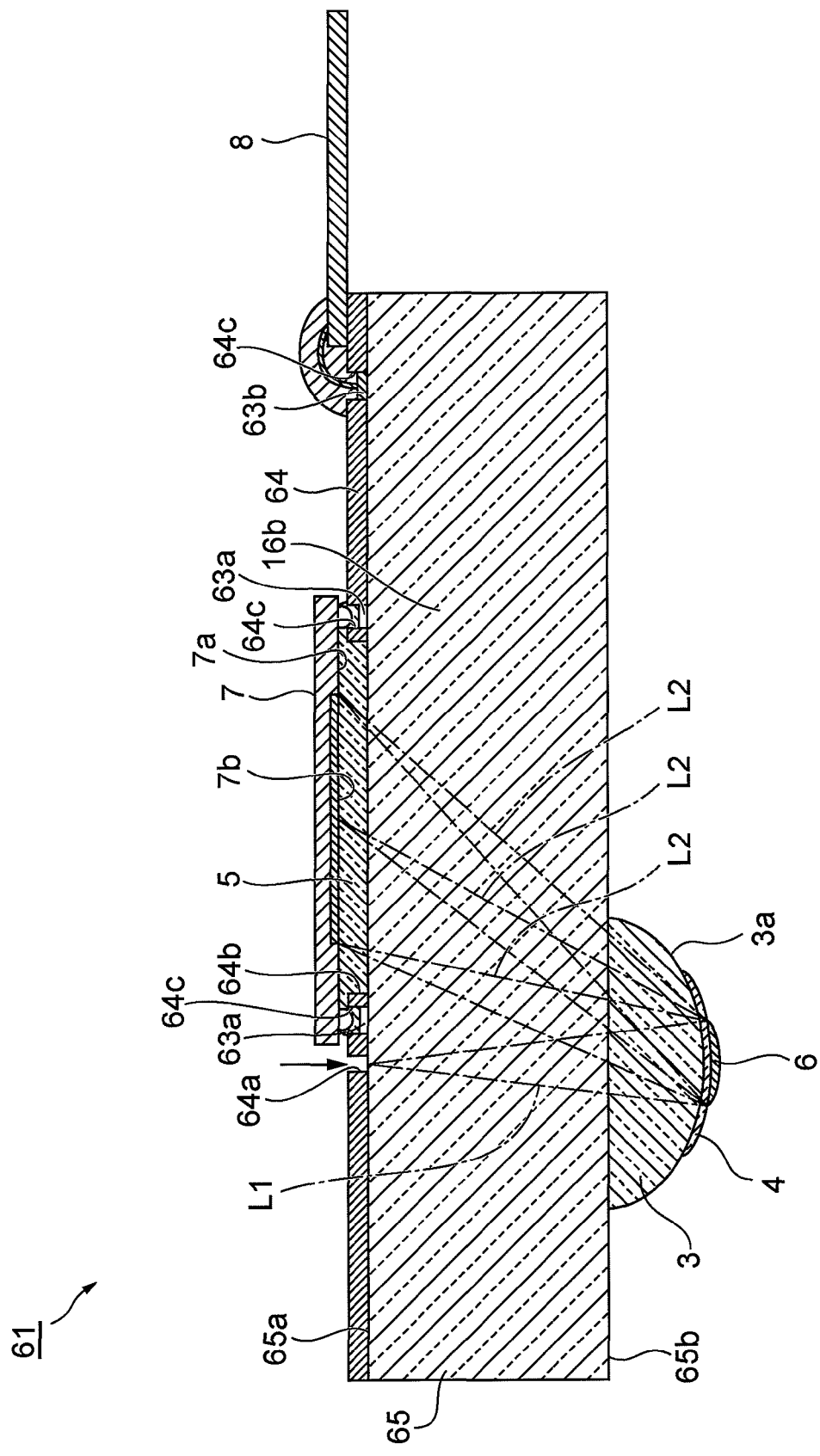

SPECTROSCOPIC MODULE

TECHNICAL FIELD

The present invention relates to a spectroscopy module for dispersing light to detect the light.

BACKGROUND ART

There is known such a conventional spectroscopy module that is provided with a block-shaped supporting body, which is a double convex lens, a spectroscopic portion such as a diffraction grating on one convex plane of the supporting body, and a light detecting element such as a photo diode on the other convex plane of the supporting body (refer to Patent Document 1, for example). In the above-described spectroscopy module, light made incident from the other convex plane is dispersed at the spectroscopic portion and the thus dispersed light is detected by the light detecting element.
Patent Document 1: Japanese Published Unexamined Patent Application No. H04-294223

DISCLOSURE OF THE INVENTION

Problem to be Solved by the Invention

Incidentally, recently, it has been demanded that spectroscopy modules be downsized and produced easily on a large scale. However, in the above-described spectroscopy module, it is difficult to downsize and produce it on a large scale due to the fact that a block-shaped supporting body, or a double convex lens, is used as a body portion.

Therefore, the present invention is to provide a spectroscopy module which can be downsized and also produced easily on a large scale.

Means for Solving the Problem

In order to attain the above object, the spectroscopy module of the present invention is constituted with a plate-shaped body portion for transmitting light made incident from one plane, a spectroscopic portion provided on the other plane of the body portion to disperse light transmitted through the body portion and reflect the light on the one plane, and a light detecting element provided on the one plane to detect the light dispersed and reflected by the spectroscopic portion.

Since the spectroscopy module is provided with a plate-shaped body portion, the body portion is made thin so that the spectroscopy module can be downsized. Further, since the body portion is formed in a plate shape, for example, a wafer process is used to produce the spectroscopy module. In other words, the spectroscopic portion and the light detecting element are provided in a matrix form on a wafer, which can be made into many body portions. Then, the wafer is subjected to dicing, thus making it possible to produce many spectroscopy modules. In this way, it is possible to produce the spectroscopy module easily on a large scale.

Further, in the spectroscopy module of the present invention, it is preferable that a wiring electrically connected to the light detecting element is provided on the side of one plane. According to the above constitution, it is possible to connect electrically an external wiring to the light detecting element via a wiring installed at the body portion without directly connecting the external wiring to the light detecting element. Thereby, a local stress is suppressed from being applied to the light detecting element when the spectroscopy module is handled or connected to an external apparatus. Thus, when the spectroscopy module is to be downsized, it is possible to prevent the light detecting element from being peeled off or the spectroscopy module from being broken. Further, the light detecting element is directly connected to the wiring installed at the body portion, thereby shortening the distance between the body portion and the light detecting element. As a result, it is possible to prevent light dispersed and reflected by the spectroscopic portion from being attenuated or stray light from being made incident.

Further, in the spectroscopy module of the present invention, it is preferable that a light absorbing layer is provided between the one plane and the wiring. According to the above constitution, it is possible to prevent light dispersed and reflected by the spectroscopic portion from being reflected in a diffused manner between the wiring and the body portion and consequently made incident into the light detecting element.

Further, in the spectroscopy module of the present invention, it is preferable that the light absorbing layer is made rough on the surface (the plane on the side of the wiring). According to the above constitution, it is possible to prevent more effectively the light reflected in a diffused manner between the wiring and the body portion from being made incident into the light detecting element.

Further, in the spectroscopy module of the present invention, it is preferable that a flexible board electrically connected to the wiring is provided on one plane. Direct connection of the light detecting element to the flexible board tends to give a local stress to the light detecting element, in particular where the spectroscopy module is to be downsized. However, according to the above constitution, since the flexible board is electrically connected to the light detecting element via the wiring installed at the body portion, it is possible to suppress the light detecting element from being subjected to the stress. Thereby, even where the spectroscopy module is to be downsized, it is possible to prevent the light detecting element from being peeled off or the spectroscopy module from being broken.

Still further, in the spectroscopy module of the present invention, it is preferable that the body portion is provided with at least two laminated translucent plates. According to the above constitution, the spectroscopy module can be produced by a process in which the light detecting element is fitted to one translucent plate, a process in which the spectroscopic portion is fitted to the other translucent plate, and a process in which these translucent plates are bonded together. In other words, for example, a process in which the light detecting element and the spectroscopic portion are fitted to a wafer is not conducted from two sides of the wafer, but the process is divided into a process which is conducted only from one side of the wafer and another process conducted from the other side. Thereby, the process for producing the spectroscopy module is made optimal for the wafer process and the spectroscopy module can be produced more easily on a large scale.

In addition, in the spectroscopy module of the present invention, it is preferable that a light-absorbing film for absorbing light is provided at a predetermined area between the translucent plates which are adjacent to each other (laminated translucent plates). According to the above constitution, stray light advancing inside the body portion can be absorbed by the light-absorbing film, thus making it possible to decrease the stray light made incident into the light detecting element and also reduce noise.

Effect of the Invention

According to the present invention, it is possible to downsize a spectroscopy module and also produce the spectroscopy module easily on a large scale.

BRIEF DESCRIPTION OF THE DRAWINGS

FIG. 3 is a view for showing the shape of a diffraction grating, more specifically, (a) shows the shape of a blazed grating; (b), that of a binary grating; and (c), that of a holographic grating.

FIG. 4 is a view for showing a glass wafer used in producing a translucent plate, and (a) is a plan view of the glass wafer, while (b) is a side elevational view thereof.

FIG. 6 is a view for describing a production process for forming a lens portion, a diffracting layer and a reflecting layer on the translucent plate.

FIG. 7 is a view for describing a production process for forming the lens portion, the diffracting layer and the reflecting layer on the translucent plate.

FIG. 8 is a view for describing a production process for forming the lens portion, the diffracting layer and the reflecting layer on the translucent plate.

FIG. 11 is a view for describing a production process for forming the grating lens portion and the reflecting layer on the translucent plate.

FIG. 12 is a view for describing a production process for forming the grating lens portion and the reflecting layer on the translucent plate.

FIG. 14 is a cross sectional view for showing the spectroscopy module of a fourth embodiment, which corresponds to FIG. 2.

FIG. 15 is a cross sectional view showing the spectroscopy module of a fifth embodiment, which corresponds to FIG. 2.

Figure 1:
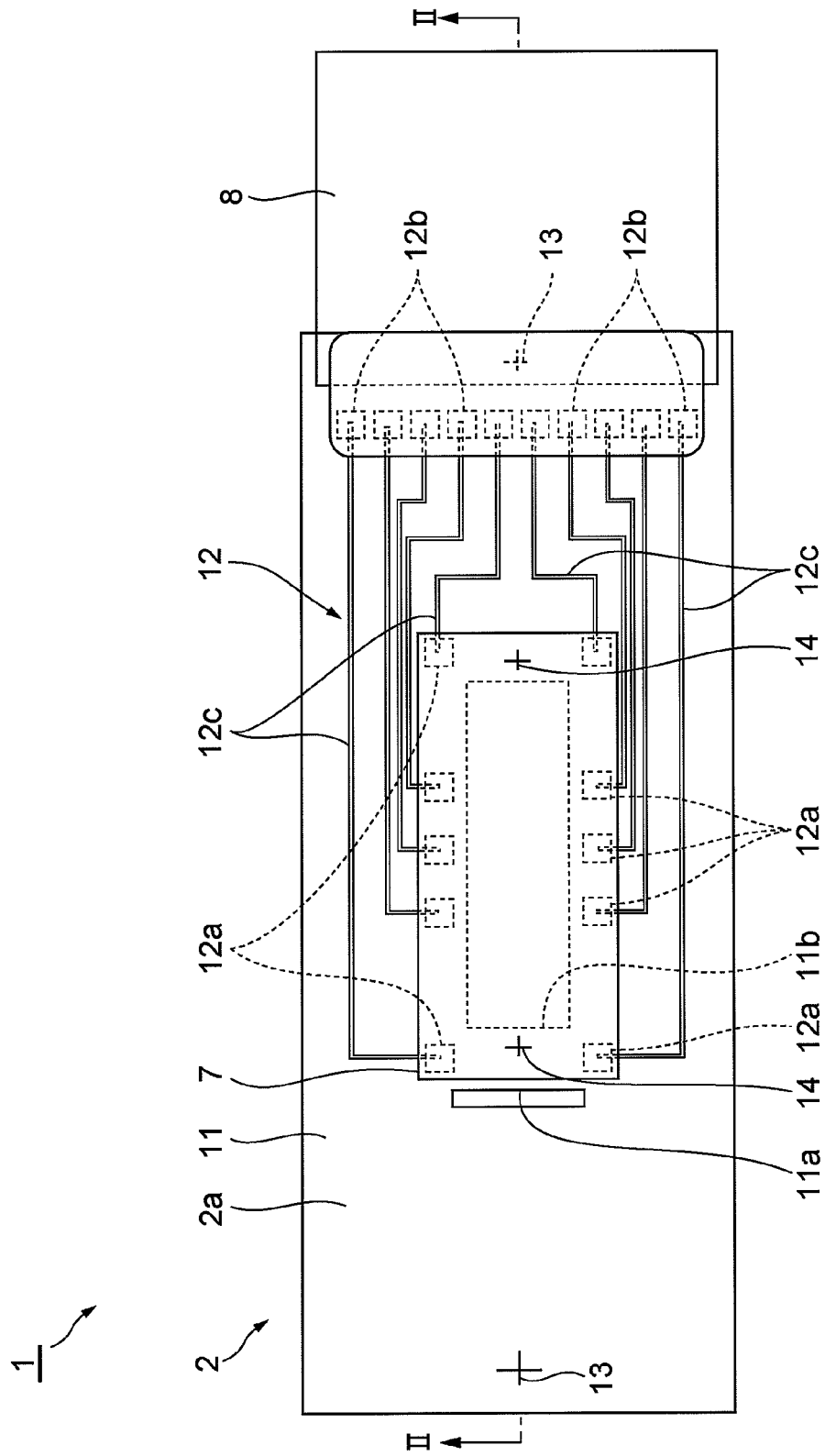
FIG. 1 is a plan view of the spectroscopy module of a first embodiment.

DESCRIPTION OF REFERENCE NUMERALS 1, 31, 41, 51, 61: spectroscopy module
2, 52: body portion
2a, 52b, 65a: surface (one plane)
2b: back plane (other plane)
2c, 2d: translucent plate
3, 23b: lens portion (spectroscopic portion)
4, 23a: diffracting layer, diffracting layer portion (spectroscopic portion)
6: reflecting layer (spectroscopic portion)
7: light detecting element
7b: light detecting plane
8: flexible board
11: light absorbing layer
12, 63: wiring
16, 64: light absorbing film
23: grating lens portion (spectroscopic portion)

BEST MODES FOR CARRYING OUT THE INVENTION

Hereinafter, a detailed description will be given to preferred embodiments of the spectroscopy module of the present invention by referring to the drawings. It is noted that in individual drawings, the same reference letters or numerals are given to the same or corresponding parts, with overlapping description omitted.

First Embodiment

Figure 2:
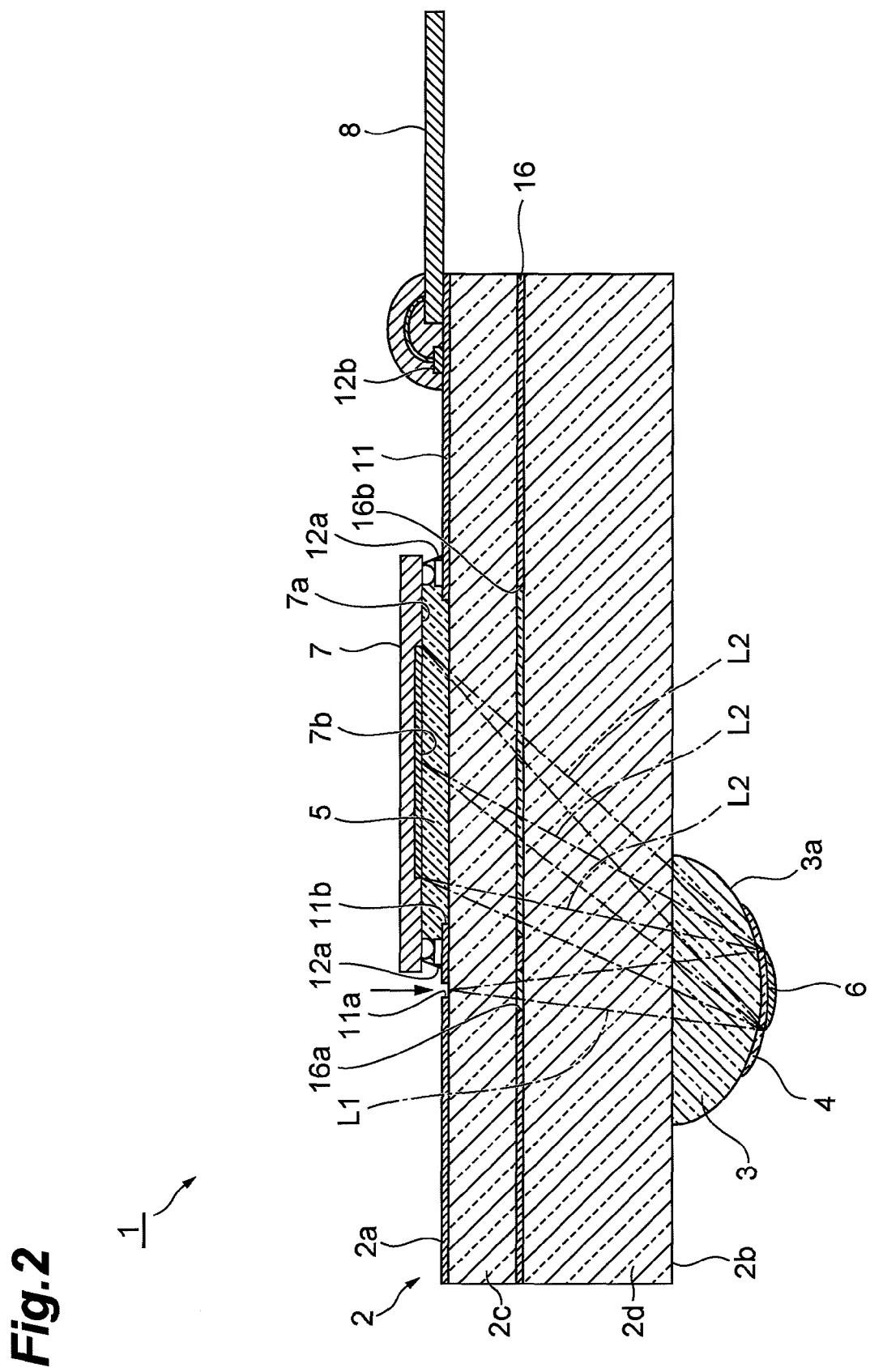
FIG. 2 is a cross sectional view taken along line II-II given in FIG. 1.

As shown in FIG. 1 and FIG. 2, the spectroscopy module 1 is constituted with a rectangular plate-shaped body portion 2, a lens portion (spectroscopic portion) 3 provided on the back plane 2b of the body portion 2, a diffracting layer (spectroscopic portion) 4 formed along the curved plane of the lens portion 3, a reflecting layer (spectroscopic portion) 6 formed on the surface of the diffracting layer 4, a light detecting element 7 installed approximately at the center of a surface 2a of the body portion 2, and a flexible board 8 fixed to the edge portion of the surface 2a in the longitudinal direction. The spectroscopy module 1 is such that incident light L1 made incident from the surface 2a is diffracted by the diffracting layer 4 and dispersed into a plurality of diffracted lights L2, then, the diffracted light L2 is reflected by the reflecting layer 6 toward the light detecting element 7, thereby detecting the diffracted light L2 by the light detecting element 7, thus measuring the wavelength distribution of the incident light L1 and the intensity of a specific wavelength component.

The body portion 2 is formed by bonding together a plate-shaped translucent plate 2c and a translucent plate 2d, which are rectangular and thin. A light absorbing layer 11 is formed on the surface 2a of the body portion 2, and a wiring 12 is formed on the surface of the light absorbing layer 11. Further, alignment marks 13, 14 for positioning on production are formed on the surface of the light absorbing layer 11, and an alignment mark 17 (to be described later) is formed at a position corresponding to the alignment mark 13 on the back plane 2b.

The translucent plates 2c, 2d are made by using a light-transmitting material such as glass or quartz, for example, BK7 or Pyrex (registered trade mark), having the quality of allowing the incident light L1 and the diffracted light L2 to advance inside the interior thereof. The translucent plate 2c on the surface 2a is preferably 2 mm or less in thickness because the light absorbing layer 11 and the wiring 12 are formed by a wire forming process which is the same as the wafer process.

A light absorbing film 16 which has the quality of absorbing light is formed at a predetermined area between the translucent plate 2c and the translucent plate 2d. The light absorbing film 16 is made of a black resist, CrO, or a CrO-containing laminated film and provided with a slit 16a for passing the incident light L1 and an opening portion 16b for passing the diffracted light L2.

The light absorbing layer 11 has the quality of absorbing light and made with the same material as that of the light absorbing film 16. The light absorbing layer 11 is made rough on the surface (the plane on the wiring 12). Further, the light absorbing layer 11 is provided with a slit 11a for passing the incident light L1 from the outside and an opening portion 11b for passing the diffracted light L2 advancing from the translucent plates 2c, 2d to the light detecting element 7.

The slit 11a extends to a direction approximately orthogonal to the longitudinal direction at a position adjacent to the light detecting element 7 in the longitudinal direction of the body portion 2. Further, the opening portion 11b is formed approximately at the center of the body portion 2 so as to be opposed to a light detecting plane of the light detecting element 7.

It is noted that the slit 16a and the opening portion 16b of the light absorbing film 16 are formed so as to be opposed respectively to the slit 11a and the opening portion 11b. Further, when viewed from the surface 2a, the slit 16a is of such a size that encircles the slit 11a, and the opening portion 16b is of such a size that encircles the opening portion 11b. The slit 16a can be used to limit incident light L1 to a range at which it is made incident into the diffracting layer 4. Still further, on the assumption that the incident light L1 advances to an unnecessary site to cause reflected light (stray light) at the unnecessary site, it is possible to prevent the stray light from being made into the light detecting element 7 due to the fact that the opening portion 16b limits a range at which light passes. As described so far, it is possible to improve the accuracy of the spectroscopy module 1.

The wiring 12 is constituted with a plurality of terminal portions 12a electrically connected to the light detecting element 7, a plurality of terminal portions 12b electrically connected to the flexible board 8, and a wiring portion 12c electrically connected to the terminal portion 12a and the terminal portion 12b which correspond each other. Further, the terminal portions 12a, the terminal portions 12b and the wiring portion 12c are formed by using a single layer of aluminum, gold or a laminated film of Ti—Pt—Au, Ti—Ni—Au or Cr—Au. The terminal portions 12a are arranged so as to encircle a marginal portion of the opening portion 11b, and the terminal portions 12b are arranged along the edge portion in the longitudinal direction of the surface 2a.

The light detecting element 7 is formed in a rectangular thin plate shape and arranged at a position so as to be opposed to the opening portion 11b on the surface 2a of the body portion 2. The light detecting element 7 is fitted to the surface 2a of the body portion by flip chip bonding, and a terminal portion (not illustrated) formed on the surface 7a of the light detecting element 7 is electrically connected to the terminal portion 12a. A light detecting plane 7b for receiving diffracted light L2 which has passed through the opening portion 11b is formed approximately at the center of the surface 7a. The light detecting element 7 includes, for example, a photo diode array, a C-MOS image sensor, and a CCD image sensor. Then, an underfill resin 5 is filled between the light detecting element 7 and the surface 2a of the body portion 2.

The flexible board 8 is a flexible printed board and connected to the terminal portion 12b by wire bonding.

The lens portion 3 is provided at a position so as to be opposed to the slit 11a on the back plane 2b of the body portion 2. The lens portion 3 is a lens formed in a shape close to a hemisphere, and the surface thereof is given as a convex curved plane 3a having a predetermined curvature. Further, the lens portion 3 is arranged in such a manner that the lens center of the convex curved plane 3a is approximately superimposed on the central part of the slit 11a. It is noted that the convex curved plane 3a may be an aspheric surface.

The diffracting layer 4 is formed along the convex curved plane 3a of the lens portion 3. The diffracting layer 4 is of a type of grating, for example, serrated cross-sectional blazed grating as shown in FIG. 3(a), a rectangular cross-sectional binary grating as shown in FIG. 3(b) or a sinusoidal cross-sectional holographic grating as shown in FIG. 3(c). The light detecting plane of the light detecting element 7 extends in a direction at which the diffracted light L2 is dispersed by the diffracting layer 4. A reflecting layer 6 is formed on the surface of the diffracting layer 4 by evaporation of aluminum or gold.

A description will be given to a method for producing the above spectroscopy module 1.

At first, the light absorbing layer 11 is subjected to patterning so that patterns of the slit 11a and the opening portion 11b are formed on the surface of the translucent plate 2c. At the same time, the wiring 12 and the alignment marks 13, 14 are subjected to patterning on the surface. The patterning is conducted by a wire forming process which is the same as the wafer process.

The light detecting element 7 is fitted to the surface of the translucent plate 2c by flip chip bonding. In this instance, the alignment mark 14 is positioned as a reference. In this way, since the alignment mark 14 is referenced which is formed by the same process as that of the slit 11a, it is possible to position the slit 11a and the light detecting plane 7b of the light detecting element 7 at a high accuracy.

Figure 5:
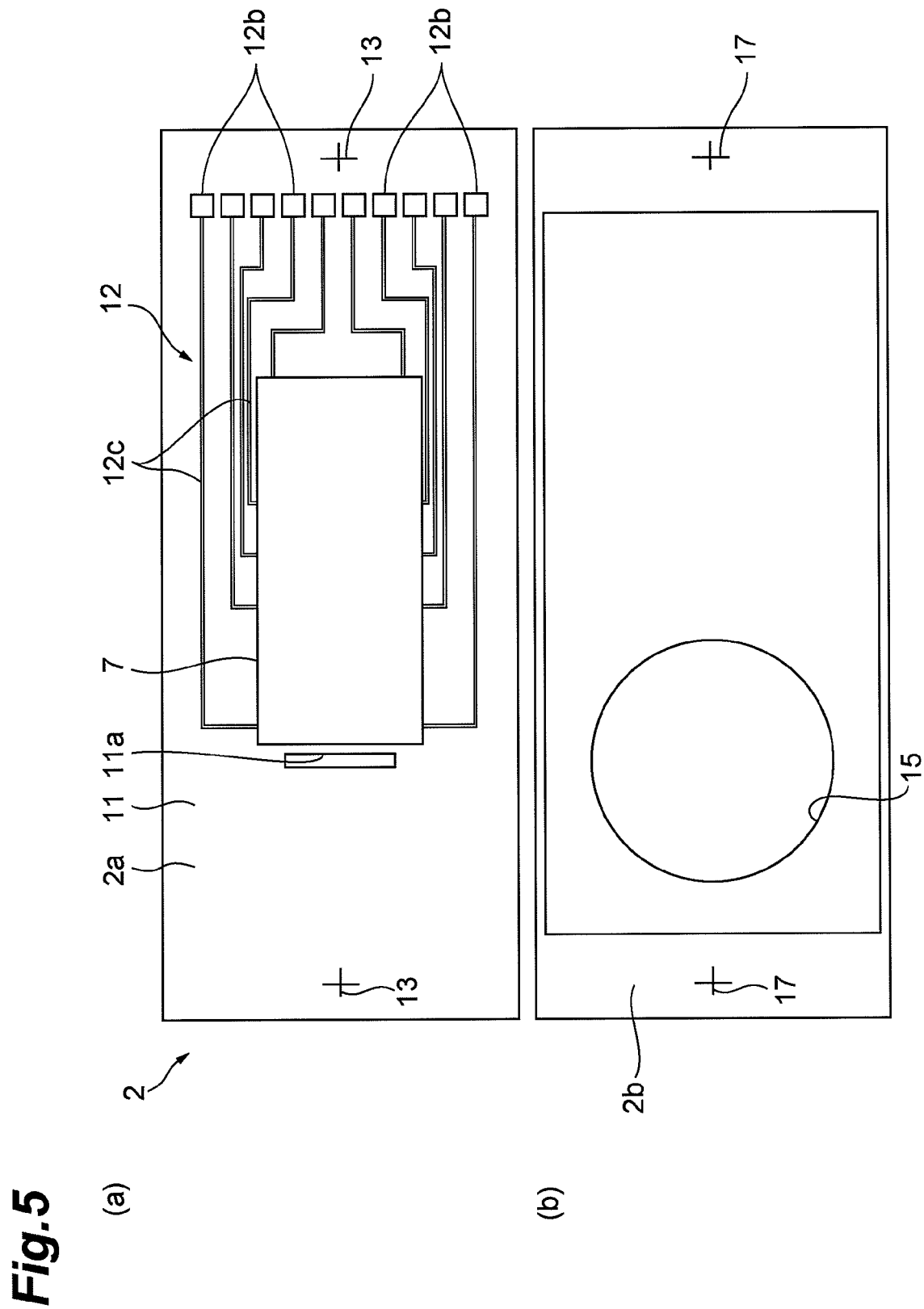
FIG. 5 is a view for showing the positions of alignment marks formed on the translucent plate, (a) shows the alignment marks on the upper translucent plate, while (b) shows the alignment marks on the lower translucent plate.

Then, the lens portion 3, the diffracting layer 4 and the reflecting layer 6 are formed on the back plane of the translucent plate 2d. This process is able to produce them on a large scale and, therefore, carried out by the wafer process. In other words, as shown in FIG. 4(a) and (b), a dicing line which is divided into a size of the translucent plate 2d is provided on a glass wafer. Then, as shown in FIG. 5(b), a photo etching process is conducted to form simultaneously at each division a lens fitting portion 15 and an alignment mark 17.

The lens fitting portion 15 is formed by providing a circular recessed portion on the translucent plate 2d. Further, the alignment mark 17 is provided at a position opposing the alignment mark 13 on the surface 2a in the thickness direction shown in FIG. 5(a), where the translucent plate 2c and the translucent plate 2d are bonded together.

Then, a small-size lens is bonded by using an optical resin or the like and fitted to each lens fitting portion 15 of the glass wafer, thereby forming the lens portion 3. Further, after the diffracting layer 4 and the reflecting layer 6 are formed at the lens portion 3, dicing is conducted along the dicing line, by which the glass wafer is divided into individual translucent plates 2d.

Here, a description will be given to a process at which the lens portion 3 and others are fitted to the glass wafer by referring to FIG. 6 to FIG. 8.

As shown in FIG. 6(a) to (c), a photosensitive resin pattern 19 is formed on the surface of the glass wafer 18, thereby providing the lens fitting portion 15 and the alignment mark 17. In this instance, the lens fitting portion 15 may be formed by etching the glass wafer 18 itself or subjecting a metal film to patterning. An optical resin 21 is coated to bond a lens to the thus formed lens fitting portion 15.

Then, as shown in FIG. 7(a) and (b), a lens 22 is fitted to the lens fitting portion 15, thereby forming the lens portion 3. A light curable resin 25 for forming a diffracting layer 4 is coated on a curved plane of the thus fitted lens 22.

As shown in FIG. 8(a) and (b), a light-transmitting mold 24 made of quartz or the like is allowed to be in contact with the thus coated light curable resin 25. With this state kept, ultraviolet light is irradiated to the light curable resin 25 above the light-transmitting mold 24 to effect UV curing treatment, thereby forming the diffracting layer 4 on the curved plane of the lens 22. Further, it is preferable that heating and curing are effected after the UV curing treatment to stabilize the diffracting layer 4. After the diffracting layer 4 is formed, aluminum or gold is evaporated on the outer plane thereof, thus forming a reflecting layer 6. It is noted that the diffracting layer 4 is formed by using a photosensitive resin, glass, an organic-inorganic hybrid material, a heat deformable resin/glass, or an organic-inorganic hybrid material. In this instance, the curvature radius of the curved plane of the lens 22 is set to be greater than that of the diffracting layer 4, thereby the curvature radius of the diffracting layer 4 reflects the curvature radius of the light-transmitting mold 24. Further, a position at which the diffracting layer 4 is formed reflects a position with which the light-transmitting mold 24 is in contact.

Therefore, where the lens 22 has a tolerance in terms of the curvature radius or there is an error of position at which the lens 22 is fitted to a glass wafer 18, it is possible to make constant a position at which the diffracting layer 4 is formed (XYZ direction).

Figure 9:
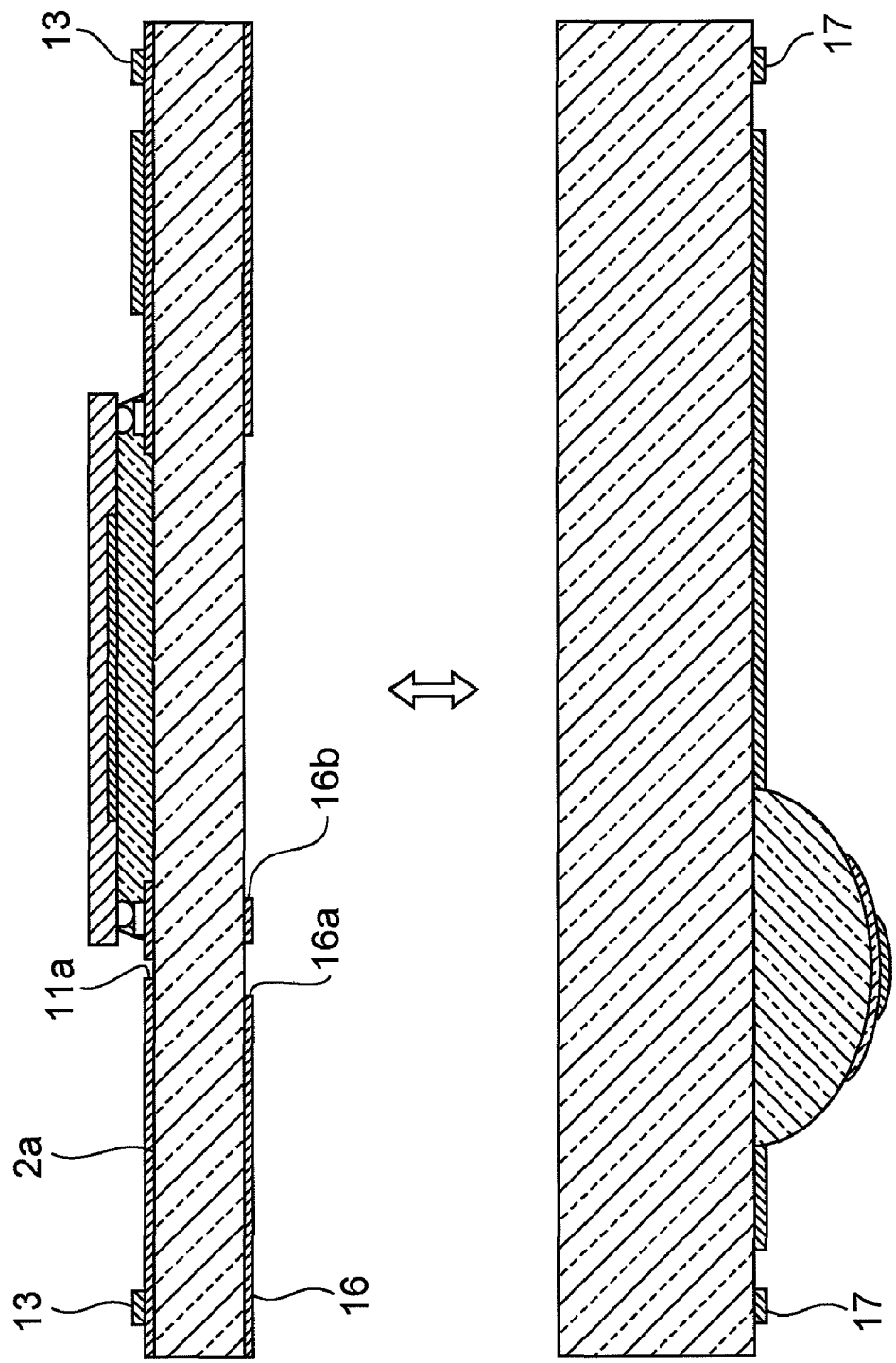
FIG. 9 is a view for showing a process in which the upper translucent plate is bonded to the lower translucent plate by referring to alignment marks.

As described above, the translucent plate 2c and the translucent plate 2d on which individual constituents are installed are bonded together. They are bonded in such a manner that a light absorbing film 16 is held between the translucent plates 2c and 2d and cured by coating an optical resin. The light absorbing film 16 is formed on one of the translucent plates 2c and 2d by photo etching or the like. Further, as shown in FIG. 9, they are bonded by reference to the alignment marks 13 of the translucent plate 2c and the alignment marks 17 of the translucent plate 2d. Thereby, it is possible to position the slit 11a, the diffracting layer 4 and the light detecting element 7 at a high accuracy.

A description will be given to the working effect of the above spectroscopy module 1.

Since the body portion 2 is formed in a plate shape, the body portion 2 is made thin, thereby downsizing the spectroscopy module 1. Further, the body portion 2 is formed in a plate shape, for example, the wafer process can be used to produce the spectroscopy module. In other words, the lens portion 3, the diffracting layer 4, the reflecting layer 6 and the light detecting element 7 are provided in a matrix form on a glass wafer, which is then made into many body portions 2. The glass wafer is subjected to dicing, thus making it possible to produce many spectroscopy modules 1. In this way, it is possible to produce the spectroscopy module 1 easily on a large scale.

Further, since the wiring 12 is formed on the surface 2a of the body portion 2, an external wiring is not directly connected to the light detecting element 7 but the external wiring can be electrically connected to the light detecting element 7 via the wiring 12 installed at the body portion 2. Thereby, a local stress is suppressed from being applied to the light detecting element 7 when the spectroscopy module 1 is handled or connected to an external apparatus. Thus, where the spectroscopy module 1 is to be downsized, it is possible to prevent the light detecting element 7 from being peeled off or the spectroscopy module 1 from being broken. The light detecting element 7 is directly connected to the wiring 12 installed at the body portion 2, thereby shortening the distance between the body portion 2 and the light detecting plane 7b of the light detecting element 7. As a result, it is possible to prevent diffracted light L2 from being attenuated or stray light from being made incident.

Further, since the light absorbing layer 11 for absorbing light is formed between the wiring 12 and the body portion 2, it is possible to prevent the diffracted light L2 reflected from the reflecting layer 6 from being reflected in a diffused manner between the wiring 12 and the body portion 2.

Further, the light absorbing layer is made rough on the surface of the light absorbing layer 11 (the plane on the side of the wiring 12). Thus, where stray light made incident from the body portion 2 into the light absorbing layer 11 transmits through the absorption layer 11 and is reflected on the body portion 2 by the wiring 12, it is possible to absorb the stray light and more effectively prevent the light reflected in a diffused manner between the wiring 12 and the body portion 2.

Further, since the light absorbing layer 11 is made rough on the surface (the plane on the side of the wiring 12), it is possible to prevent the wiring 12 formed on the surface of the light absorbing layer 11 from being peeled off.

Further, the flexible board 8 and the light detecting element 7 are not directly connected but they can be electrically connected via the wiring 12 installed at the body portion 2. Therefore, it is possible to suppress a stress from being applied to the light detecting element 7. Thereby, where the spectroscopy module 1 is to be downsized, it is possible to prevent the light detecting element 7 from being peeled off or the spectroscopy module 1 from being broken.

Still further, the body portion 2 is provided with translucent plates 2c and 2d which are laminated. The spectroscopy module 1 can be produced by a process in which the light detecting element 7 is fitted to the surface of the translucent plate 2c, a process in which the spectroscopic portions such as the lens portion 3, the diffracting layer 4 and the reflecting layer 6 are fitted to the back plane of the translucent plate 2d, and a process in which these translucent plates 2c and 2d are bonded together. In other words, for example, a process in which the light detecting element 7 and the spectroscopic portion are fitted to a glass wafer is not conducted from two sides of the glass wafer, but the process is divided into a process which is conducted only from one side of the glass wafer and another process conducted from the other side. Thereby, the process for producing the spectroscopy module 1 is made optimal for the wafer process and the spectroscopy module 1 can be produced more easily on a large scale.

The light absorbing film 16 provided between the translucent plates 2c and 2d to absorb light can be used to absorb stray light advancing inside the body portion 2, thus making it possible to decrease the stray light made incident into the light detecting element 7 and reduce noise.

Second Embodiment

A spectroscopy module 31 of the second embodiment is different from the spectroscopy module 1 of the first embodiment in that the lens portion 3 is formed integrally with the diffracting layer 4.

Figure 10:
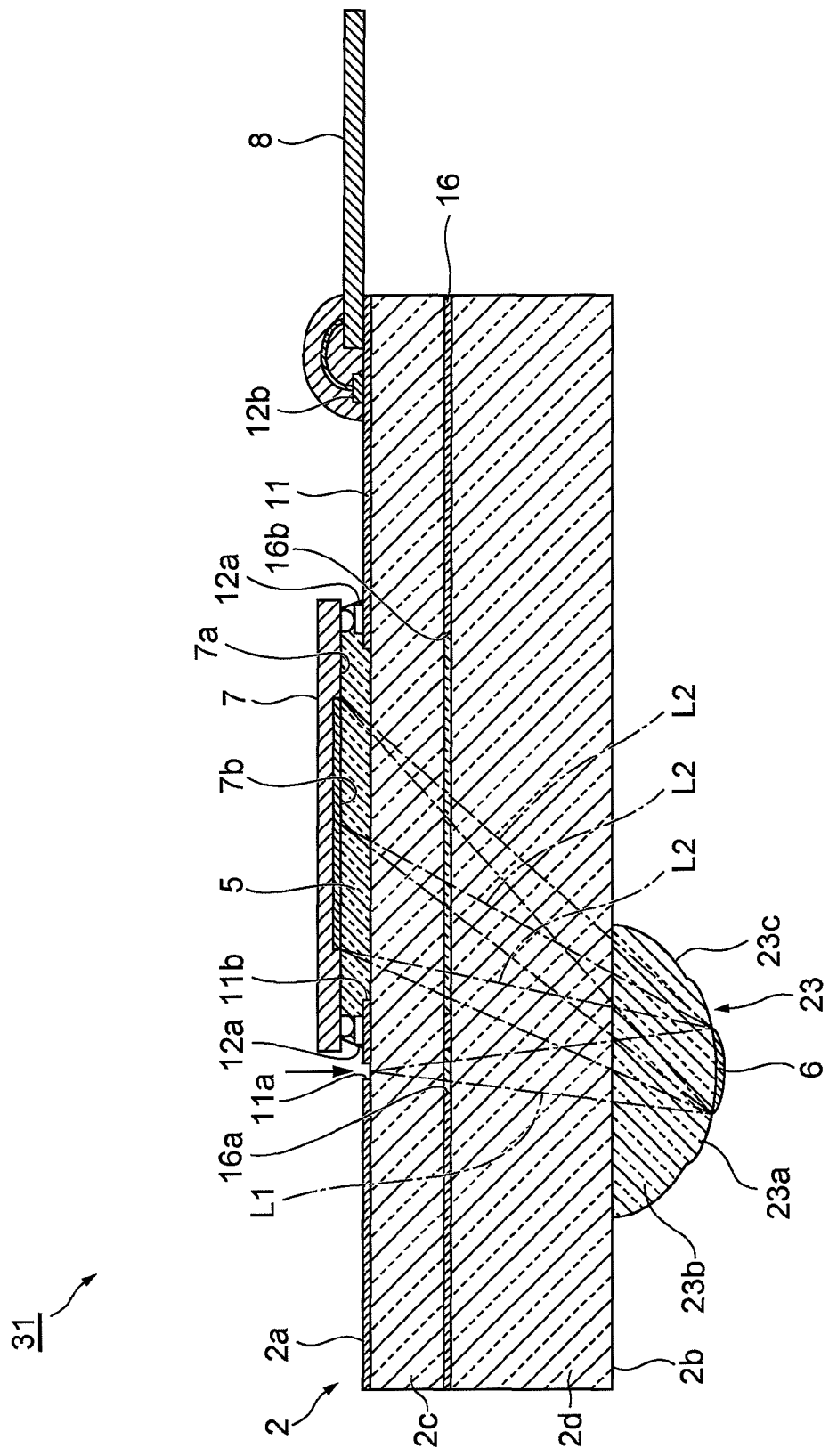
FIG. 10 is a cross sectional view for showing the spectroscopy module of a second embodiment, which corresponds to FIG. 2.

In other words, in the spectroscopy module 31 of the second embodiment, as shown in FIG. 10, a grating lens portion 23 having integrally a diffracting layer portion 23a on a convex curved plane 23c of the lens portion 23b is provided at a position opposing the slit 11a on the back plane 2b of the body portion 2.

Next, a description will be given to a method for producing the grating lens portion 23 by referring to FIG. 11 and FIG. 12.

As shown in FIG. 11(a) to (c), a photosensitive resin pattern 29 is formed on the surface of the glass wafer 18, thereby providing a grating lens fitting portion 26 and alignment marks 17. It is noted that in this instance, the grating lens fitting portion 26 may be formed by etching the glass wafer 18 itself or subjecting a metal film to patterning. A light curable resin 33 for forming the grating lens portion 23 is coated on the grating lens fitting portion 26.

As shown in FIG. 12(a) and (b), a light-transmitting mold 34 made with quartz or the like is allowed to be in contact with the thus coated light curable resin 33. With this state kept, ultraviolet light is irradiated to the light curable resin 33 from above the light-transmitting mold 34, thereby effecting UV curing treatment to form the grating lens portion 23. Further, the grating lens portion 23 is preferably made stable by heating and curing after the UV curing treatment. After the grating lens portion 23 is formed, aluminum or gold is evaporated on the outer plane thereof, thereby forming the reflecting layer 6. It is noted that the grating lens portion 23 can be formed by using materials such as a photosensitive resin/glass, an organic-inorganic hybrid material, a heat-deformable resin/glass and an organic-inorganic hybrid material.

In the spectroscopy module 31 of the above-described second embodiment, a lens portion and a diffracting layer can be formed by using an integral mold. Thus, the lens portion and the diffracting layer can be formed at an accurate position and also produced by a shorter process.

Third Embodiment

A spectroscopy module 41 of the third embodiment is different from the spectroscopy module 1 of the first embodiment in that the light absorbing film 16 is not formed between the translucent plate 2c and the translucent plate 2d.

Figure 13:
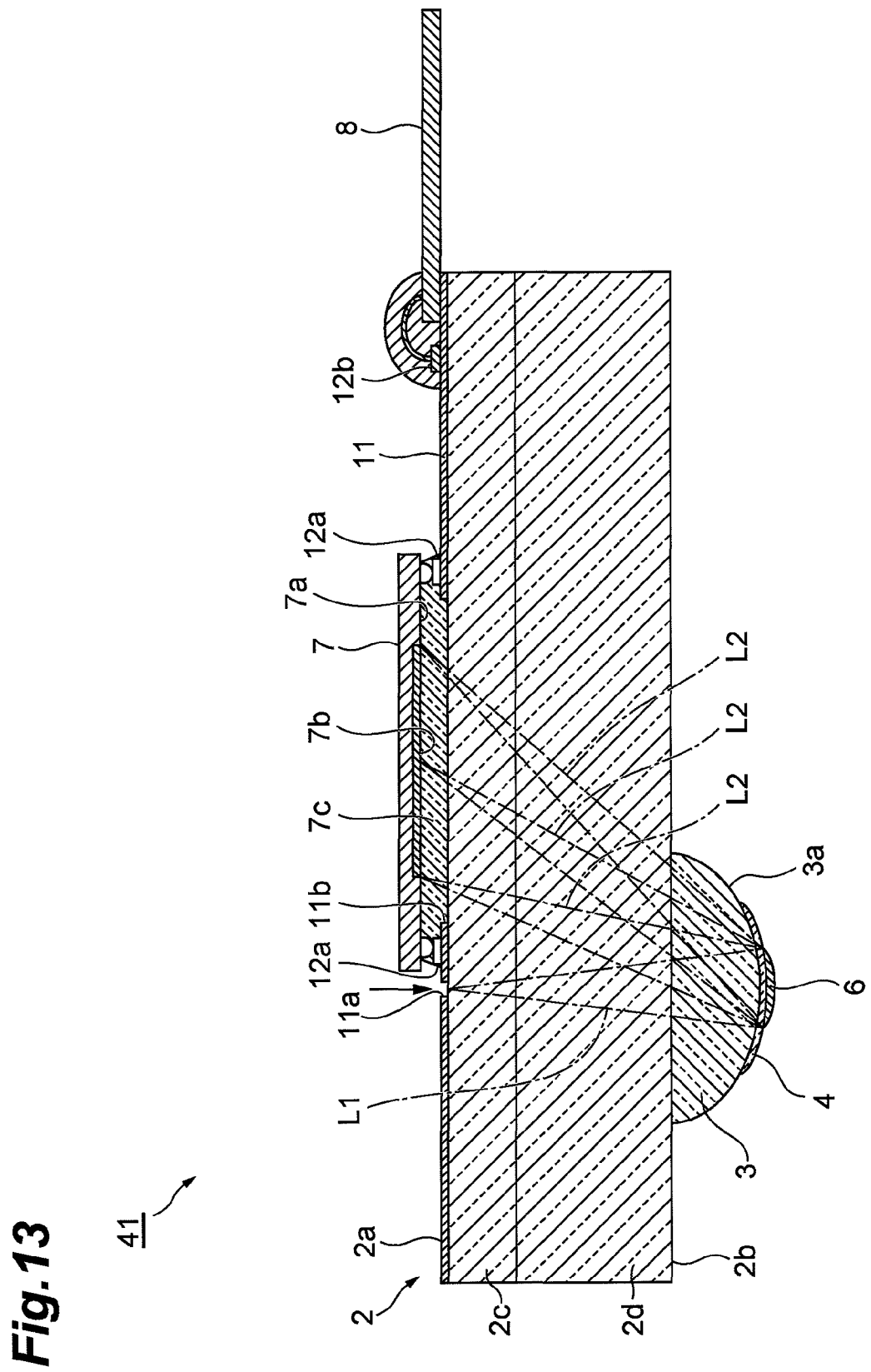
FIG. 13 is a cross sectional view for showing the spectroscopy module of a third embodiment, which corresponds to FIG. 2.

In other words, in the spectroscopy module 41 of the third embodiment, as shown in FIG. 13, the translucent plate 2c is directly connected to the translucent plate 2d with an optical resin or by direct bonding.

Fourth Embodiment

A spectroscopy module 51 of the fourth embodiment is different from the spectroscopy module 1 of the first embodiment in that the body portion 52 is formed by using one sheet of a translucent plate.

In other words, in the spectroscopy module 51 of the fourth embodiment, as shown in FIG. 14, the body portion 52 is constituted with a translucent plate 52a, a light absorbing layer 11 formed on the surface 52b thereof and a wiring layer 12.

Fifth Embodiment

A spectroscopy module 61 of the fifth embodiment is different from the spectroscopy module 51 of the fourth embodiment in that a light absorbing layer 64 is formed on a wiring 63.

In other words, in the spectroscopy module 61 of the fifth embodiment, as shown in FIG. 15, the wiring 63 is formed on the surface 65a of the translucent plate 65, and the light absorbing layer 64 is formed therefrom. The light absorbing layer 64 is provided not only with a slit 64a and an opening portion 64b but also with an opening portion 64c for exposing a terminal portion 63a and a terminal portion 63b on the wiring layer 63 from the light absorbing layer 64.

The above-described spectroscopy module 61 of the fifth embodiment is able to improve the strength of the wiring 63 because the wiring 63 attached to a translucent member more firmly is directly formed at the translucent plate 65.

The present invention shall not be limited to the above-described embodiments. For example, in the present embodiment, a slit is formed on a light absorbing layer. However, a slit may be formed on a light detecting element to provide the slit. Thereby, the slit and the light detecting element are produced by the same process, thus making it possible to improve the positional accuracy between the slit and the light detecting plane. The slit may be formed on the light detecting element by wet etching using alkali, silicon deep dry etching or a combination of these etching processes.

INDUSTRIAL APPLICABILITY

According to the present invention, it is possible to downsize a spectroscopy module and also produce the spectroscopy module easily on a large scale.

The invention claimed is:

1. A spectroscopy module comprising:
    a plate-shaped body portion for transmitting light made incident from one plane;
    a spectroscopic portion provided on the other plane of the body portion to disperse light transmitted through the body portion and reflect the light to the one plane;
    a light detecting element provided on the one plane to detect the light dispersed and reflected by the spectroscopic portion; and
    a light absorbing layer formed on the one plane and having a slit through which light made incident into the body portion passes and an opening portion through which light made incident into the light detecting element passes; and
    a wiring formed on the light absorbing layer and having a plurality of first terminal portions electrically connected to the light detecting element and a plurality of second terminal portions electrically connected to an external wiring, the first terminal portions and the second terminal portions formed on the light absorbing layer.

2. The spectroscopy module as set forth in claim 1, wherein the light-absorbing layer is made rough on the surface thereof.

3. The spectroscopy module as set forth in claim 1, wherein a flexible board electrically connected to the second terminal portions of the wiring is provided on the one plane.

4. The spectroscopy module as set forth in claim 1, wherein the body portion is provided with at least two translucent plates laminated along the light incident direction.

5. The spectroscopy module as set forth in claim 4, wherein a light-absorbing film for absorbing light is provided at a predetermined area between the translucent plates, which are adjacent to each other.

6. The spectroscopy module as set forth in claim 1, wherein the spectroscopic portion has a translucent member provided on the other plane of the body portion, a diffracting layer formed along the curved plane of the translucent member, and a reflecting layer formed on the surface of the diffracting layer.

7. The spectroscopy module as set forth in claim 6, wherein the curvature radius of the curved plane of the translucent member is set to be greater than the curvature radius of the diffracting layer.

8. The spectroscopy module as set forth in claim 1, wherein the area of the opening portion of the light absorbing layer is set to be greater than the area of the slit of the light absorbing layer.

9. The spectroscopy module as set forth in claim 1, wherein the width of the slit of the light absorbing layer is set to be greater than the width of the opening portion of the light absorbing layer in a direction perpendicular to the direction along which the slit of the light absorbing layer and the opening portion of the light absorbing layer are juxtaposed.

10. The spectroscopy module as set forth in claim 5, wherein the light-absorbing film has a slit through which light made incident into the body portion passes and a opening portion through which light made incident into the light detecting element passes, the slit and the opening portion of the light-absorbing film are formed so as to be opposed respectively to the slit and the opening portion of the light absorbing layer, and viewed from the one plane, the slit of the light-absorbing film is of such a size that encircles the slit of the light absorbing layer, and the opening portion of the light-absorbing film is of such a size that encircles the opening portion of the light absorbing layer.

11. A spectroscopy module comprising:

a plate-shaped body portion for transmitting light made incident from one plane;

a spectroscopic portion provided on the other plane of the body portion to disperse light transmitted through the body portion and reflect the light to the one plane;

a light detecting element provided on the one plane to detect the light dispersed and reflected by the spectroscopic portion;

a wiring formed on the one plane and having a plurality of first terminal portions electrically connected to the light detecting element and a plurality of second terminal portions electrically connected to an external wiring, the first terminal portions and the second terminal portions formed on the one plane; and a light absorbing layer formed on the wiring and having a slit through which light made incident into the body portion passes and a opening portion through which light made incident into the light detecting element passes.

12. The spectroscopy module as set forth in claim 11, wherein a flexible board electrically connected to the second terminal portions of the wiring is provided on the one plane.

13. The spectroscopy module as set forth in claim 11, wherein the body portion is provided with at least two translucent plates laminated along the light incident direction.

14. The spectroscopy module as set forth in claim 13, wherein a light-absorbing film for absorbing light is provided at a predetermined area between the translucent plates, which are adjacent to each other.

15. The spectroscopy module as set forth in claim 11, wherein the spectroscopic portion has a translucent member provided on the other plane of the body portion, a diffracting layer formed along the curved plane of the translucent member, and a reflecting layer formed on the surface of the diffracting layer.

16. The spectroscopy module as set forth in claim 11, wherein the curvature radius of the curved plane of the translucent member is set to be greater than the curvature radius of the diffracting layer.

17. The spectroscopy module as set forth in claim 11, wherein the area of the opening portion of the light absorbing layer is set to be greater than the area of the slit of the light absorbing layer.

18. The spectroscopy module as set forth in claim 11, wherein the width of the slit of the light absorbing layer is set to be greater than the width of the opening portion of the light absorbing layer in a direction perpendicular to the direction along which the slit of the light absorbing layer and the opening portion of the light absorbing layer are juxtaposed.

19. The spectroscopy module as set forth in claim 14, wherein the light-absorbing film has a slit through which light made incident into the body portion passes and an opening portion through which light made incident into the light detecting element passes, the slit and the opening portion of the light-absorbing film are formed so as to be opposed respectively to the slit and the opening portion of the light absorbing layer, and viewed from the one plane, the slit of the light-absorbing film is of such a size that encircles the slit of the light absorbing layer, and the opening portion of the light-absorbing film is of such a size that encircles the opening portion of the light absorbing layer.

* * * * *